Jan. 22, 1929.  E. A. BINNEY  1,699,775
CONTROL SYSTEM
Filed June 4, 1923
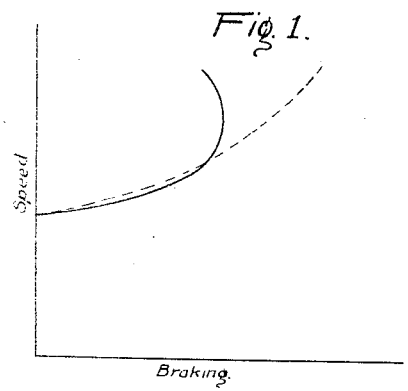
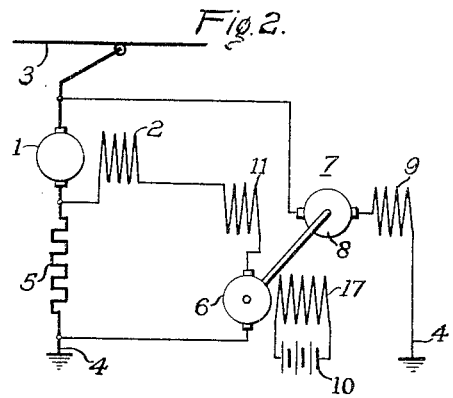
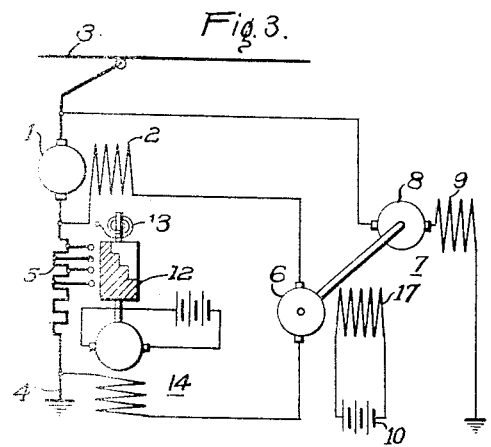
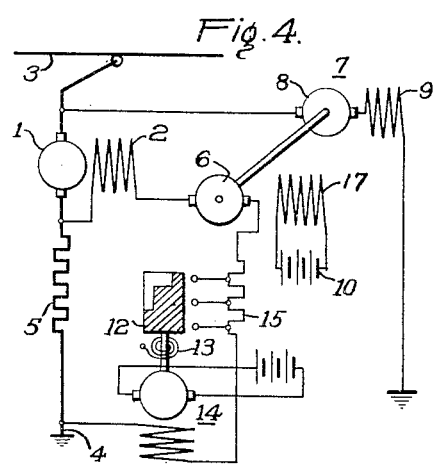
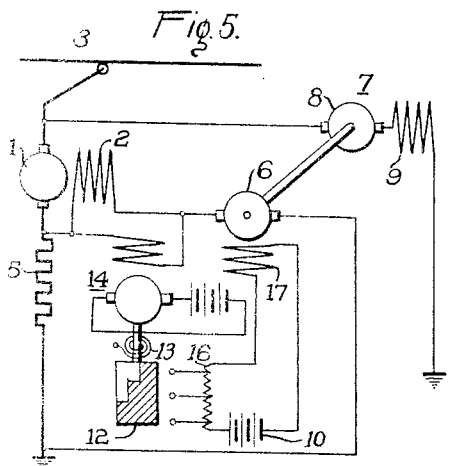
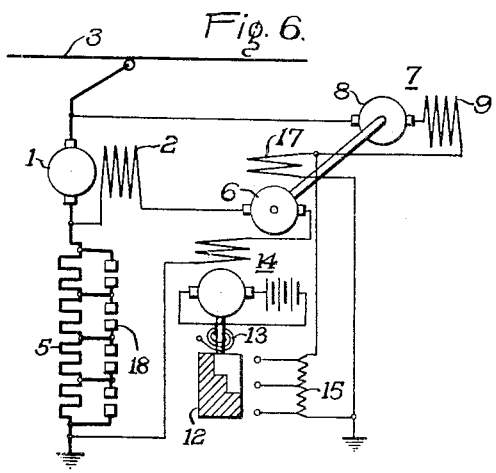
WITNESSES:
INVENTOR
Eric Alton Binney.
BY
Wesley G. Carr
ATTORNEY Patented Jan. 22, 1929.

1,699,775

UNITED STATES PATENT OFFICE.

ERIC ALTON BINNEY, OF TIMPERLEY, ENGLAND, ASSIGNOR TO WESTINGHOUSE ELECTRIC & MANUFACTURING COMPANY, A CORPORATION OF PENNSYLVANIA.

CONTROL SYSTEM.

Application filed June 4, 1923, Serial No. 643,191, and in Great Britain June 9, 1922.

My invention relates to the control of electric motors and it has particular relation to arrangements for controlling one or more direct-current electric motors when they are caused to rotate by mechanical means to return current to the source from which they are supplied when operating as motors. This method of operation is commonly known as regenerative operation and is frequently used for braking traction motors when, for example, a motor-driven vehicle is moving downhill or when it is desired to bring the vehicle to rest.

In the case of regenerative operation of traction motors, it has been proposed to separately excite the field windings of the motors by means of one or more exciter generators, the voltage of which may be adjusted so as to vary the speed of the vehicle as required. It has also been suggested in such cases to include a resistor, commonly called a stabilizing resistor, in the motor circuits in such manner that the said resistor carries both the regenerated current and the current supplied to the motor field windings by the exciter generator, the object of such resistor being to insure stability and protection in the case of sudden variations in the line voltage.

Since the stabilizing resistor is connected in circuit with the exciter generator, an increase in the regenerated or main-armature current results in a reduction of the exciting current, such reduction becoming relatively greater as the regenerated current increases owing to the fact that the magnetic circuit of the motor field winding is thus changed from a saturated to an unsaturated condition. Thus when the exciting current is high, a small reduction therein has little effect upon the strength of the field; but when the exciting current falls to a value corresponding to the bend of the knee of the magnetic saturation curve, a small variation in the exciting current produces a large variation in the field strength.

As the braking effort of the motors depends on the strength of the field and the value of the regenerated or main-armature current, it is clear that if the field decreases more rapidly than the regenerated current increases, the speed of the motors will tend to increase, owing to the reduction in braking effort. Consequently, conditions may become unstable under high regenerative-current conditions; that is, an increase in the speed of the motor, caused, for example, by an increase in a descending grade, may not result in an increase in the braking effort, which increase is essential, however, to insure stability of operation and control.

The object of the present invention is to provide an arrangement whereby the above-mentioned disadvantage is avoided and whereby a definite increase in braking effort is insured with an increase of speed under all conditions of load or regenerated current; in other words, the characteristic curve showing the relation between the speed and braking torque will be a substantially straight inclined line over the full operating range.

According to my invention, the exciting current of the motor or motors is automatically adjusted in accordance with the strength of the field flux thereof in such manner that, upon changes in the regenerated current, the field strength of the motor or motors is maintained at the requisite value to provide a braking effort substantially proportional to the speed.

To enable the invention to be clearly understood, it will now be described with reference to the accompanying drawings, in which Fig. 1 is a curve chart of braking effort and speed characteristics of a regeneratively operating electric locomotive.

Fig. 2 is a diagrammatic view of a control system arranged according to my invention, and Figs. 3, 4, 5 and 6 are diagrammatic views of various modifications of my invention as shown in Fig. 2.

Referring to Fig. 1, the full line curve therein shown represents braking effort plotted as abscissæ and speed plotted as ordinates of a locomotive operating regeneratively and provided with a stabilizing resistor in the manner referred to above. It will be seen that this curve bends upwardly as the speed increases; that is to say, the braking effort at high speeds does not increase uniformly with increase of speed and may, in some cases, be even reduced owing to the fact that the field excitation of the motors is insufficient, as hereinbefore set forth. The dotted line curve is an ideal braking effort and speed characteristic, an approximation to which is obtained by the present invention.

Referring to the arrangement illustrated in Fig. 2, the armature 1 and field winding 2 of a traction motor are connected for effecting regeneration to supply conductors 3 and 4, such as trolley and ground or rail. A stabilizing resistor 5 is included in the regenerative armature circuit, while the field winding 2 is connected in series relation with an exciter armature 6 across the stablizing resistor 5. The exciter 6 is driven by means of a motor 7 comprising an armature 8 and series field winding 9, the motor 7 being connected between trolley and ground. The exciter 6 is provided with a field winding 17, which may be supplied with current from any suitable source, such as a battery 10. The motor 7 is provided with an additional field winding 11, which is included in circuit with the main motor field winding 2 and the exciter armature 6. The winding 11 is so connected or wound as to excite the motor 7 cumulatively with respect to the series field winding 9.

With this arrangement, the current delivered to the circuit comprising the stabilizing resistor 5, the main motor field winding 2, and the field winding 11 of the auxiliary motor 7 will determine to a certain extent the speed of the auxiliary motor 7 and, therefore, of the exciter generator 6. If the regenerated current increases, upon an increase in the gradient, for example, there will be an increased voltage drop across the stabilizing resistor 5 and, therefore, a reduction in the main motor exciting current, so that the auxiliary field winding 11 of the auxiliary motor 7 is weakened, causing an increase in the speed of the exciter generator 6. This action will cause an increase in the exciting current, and stable conditions will be reached with an intermediate value of the exciting current, the field fluxes of both the main and the auxiliary motors assuming final values somewhat lower than existed prior to the change in load conditions.

The tendency is, therefore, to reestablish the strength of the field of the main motor, but this reestablishment is not quite complete. The result is that the speed of the main motor will increase slightly over the speed originally existing. The speed of the motor, however, is limited to a definite value, which is substantially in proportion to the increased regenerated current. The speed and braking effort characteristic of the motor is, therefore, approximately a sloping straight line, substantially as shown by the dotted curve in Fig. 1.

The magnetic circuit of the field winding 11 of the auxiliary motor 7 is so proportioned that the knee of the saturation curve of both the main motor and the auxiliary motor corresponds to the same exciting current. When, therefore, the field current of the main motor reaches this value, the speed of the auxiliary motor will increase by greater increments with increase of exciting current, whereby an increased compensating effect will be obtained. Furthermore, there will be a smaller reduction in exciting current, for a given increase in the regenerated current, when operating below the knee of the saturation curve.

The speed control of the main motor, in all cases, may be obtained by adjusting the voltage of the exciter 6.

According to a modification of my invention, the excitation of the main motor may be varied by changing the value of the stabilizing resistor, and this result may be effected in accordance with the excitation current. Thus, referring to Fig. 3, the stabilizing resistor 5 may be cut out in steps by means of a control drum 12, which is operated against the action of a spring 13 by a torque motor 14 the field winding of which is connected in series relation with the main motor field winding 2 and exciter armature 6. Or, as shown in Fig. 4, a resistor 15 in the circuit of the field winding 2 may be varied by the drum 12, similarly controlled by the torque motor 14. With these arrangements a definite torque is exerted by the motor 14 and a corresponding position is occupied by the drum 12 in accordance with the value of the exciting current, so that the requisite field strength for the main motor is provided. In these cases, the auxiliary motor 7 may have only a series field winding, with or without the auxiliary stablizing field winding referred to above in connection with Fig. 2. As before, the speed of the main motor may be controlled by adjustment of the exciter voltage.

According to a further modification illustrated in Fig. 5, the excitation of the main motor is controlled by means of a resistor 16 in circuit with the field winding 17 of the exciter generator 6, this resistor being varied by means of drum 12, which is operated by torque motor 14, the field winding of the torque motor being connected across the field winding 2 of the main motor. The field winding of the torque motor will, therefore, carry a current proportional to the exciting current of the main motor and the drum 12 caused to be actuated in accordance with the torque developed by the motor 14 and thereby short-circuit portions of the resistor 16. The voltage of the exciter generator 6 is thus adjusted to a definite value for each value of exciting current supplied to the main motor field winding 2. The field winding 17 of the exciter generator may be connected to a separate source of supply or it may be connected directly to the brushes of its armature 6.

In the further arrangement shown in Fig. 6, the exciter field winding 17 is excited by the current flowing in the auxiliary motor 7, the winding being connected in series relation with the latter. The field winding 17 is shunted by means of resistor 15, portions of which are adapted to be successively cut out by means of contact drum 12, operated by torque motor 14, in accordance with the current in the circuit of the main-motor field winding 2 and exciter armature 6. The drum 12 assumes a different position for each value of main field current and thereby adjusts the proportion of current flowing through the exciter field winding 17 to the required value. Thus, instead of a constant voltage being obtained, the exciter voltage is varied according to the value of the main field current. The speed control of the main motor is effected by variation of the stabilizing resistor 5, by means of contactor switches 18 controlled by the engineer, or by variation of resistor 15 through the agency of torque motor 14.

With the above described arrangements, the excitation of the field winding 2 of the main motor is automatically controlled in accordance with the field flux or degree of the saturation of the motor so that under all conditions of load or regenerated current, the field strength of the motor is maintained at the requisite value to provide a braking effort substantially proportional to the speed. This result may be obtained in other ways than those herein described. The invention may be applied to the control of more than one motor and is not limited to traction systems, being applicable to hoists, lifts and other systems wherein regenerative control is employed.

I do not wish to be restricted to the specific circuit connections or arrangement of parts herein set forth, as it is evident that various modifications thereof may be made within the spirit and scope of my invention. I desire therefore that only such limitations shall be imposed as are indicated in the appended claims.

I claim as my invention:

1. A system of regenerative control comprising a motor having a field winding, a generator for exciting said field winding, a motor for driving said generator, and means in circuit with said field winding for regulating the speed of said last-mentioned motor in proportion to the speed of said first-named motor during regenerative operation.

2. A system of regenerative control comprising a main motor having an armature and a field winding, a generator adapted to energize said field winding, an auxiliary motor disposed to drive the generator, an auxiliary field winding subject to variations in energization as the speed of the main motor varies, said auxiliary winding being adapted to control the speed of said auxiliary motor, thereby to control the voltage of said generator, and a resistor connected in the armature circuit of the main motor, said resistor being connected in series relation to said auxiliary field winding.

In testimony whereof, I have hereunto subscribed my name this 16th day of May, 1923.

ERIC ALTON BINNEY.